United States Patent [19]

Matthias

[11] 4,201,397
[45] May 6, 1980

[54] STEERING HEAD FOR BICYCLES

[75] Inventor: Jan H. Matthias, Gries, Fed. Rep. of Germany

[73] Assignee: Steyr-Daimler-Puch Aktiengesellschaft, Vienna, Austria

[21] Appl. No.: 873,907

[22] Filed: Feb. 13, 1978

[30] Foreign Application Priority Data

Feb. 1, 1977 [AT] Austria ................................. 598/77

[51] Int. Cl.² .......................................... B62K 21/06
[52] U.S. Cl. .................................... 280/280; 280/263
[58] Field of Search ........... 280/263, 279, 280, 281 R, 280/270, 274

[56] References Cited

U.S. PATENT DOCUMENTS 2,145,436  1/1939  Sullivan ............................ 280/279
2,854,249  9/1958  Jaulmes ........................... 280/281 R

FOREIGN PATENT DOCUMENTS 411083   6/1945  Italy ..................................... 280/281 R
261528   9/1949  Switzerland ............................ 280/279
202170   8/1923  United Kingdom ................. 280/281 R
209921   1/1924  United Kingdom ..................... 280/279
296,539  9/1928  United Kingdom ................. 280/281 R Primary Examiner—Stephen G. Kunin
Assistant Examiner—Edmond G. Rishell, Jr.
Attorney, Agent, or Firm—Kurt Kelman

[57] ABSTRACT

A steering head for a bicycle comprises a mounting shaft having a lower end secured to the forward end of the main bicycle frame, the mounting shaft projecting upwardly from the forward frame end. A bearing sleeve is rigid with the fork head of the front wheel fork of the bicycle and is rotatably mounted on the mounting shaft.

1 Claim, 1 Drawing Figure

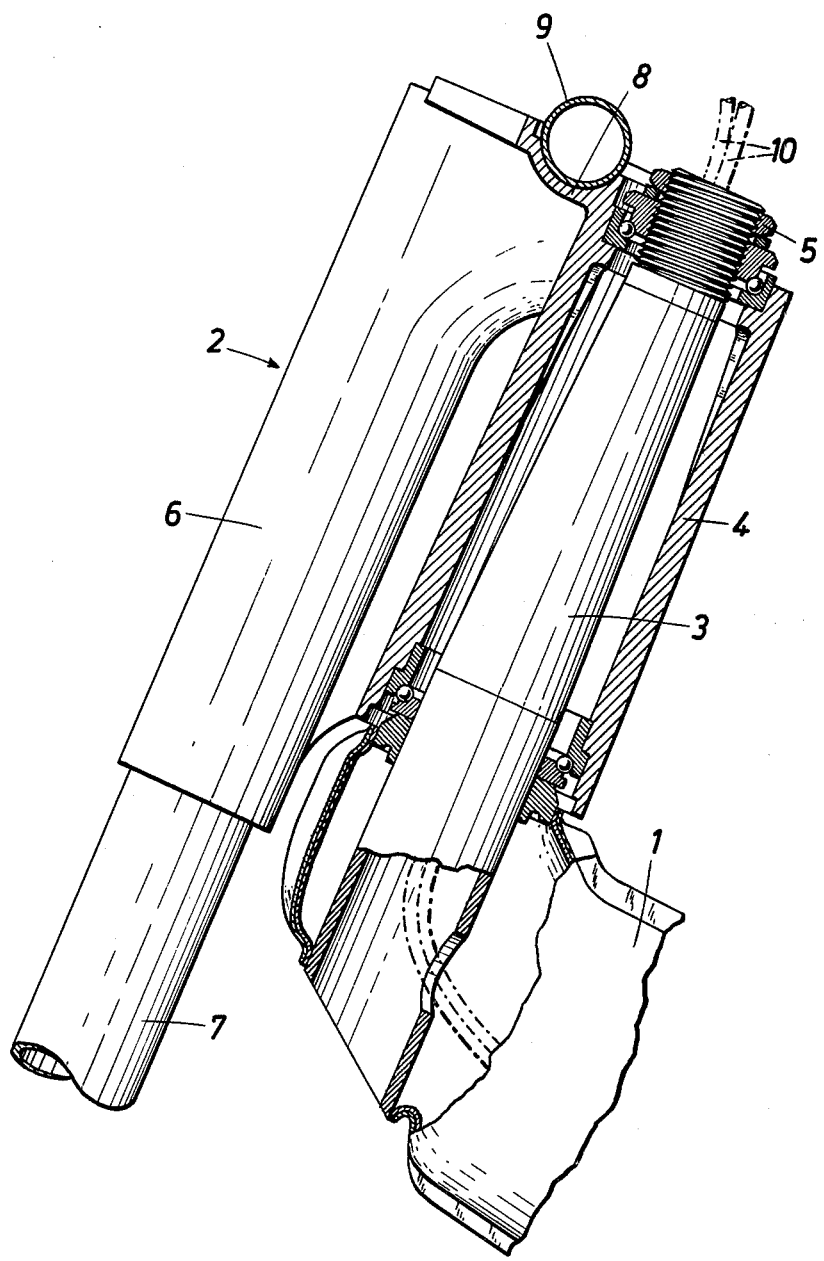

STEERING HEAD FOR BICYCLES

BACKGROUND OF THE INVENTION

1. Field of the Invention

This invention relates to a steering head for a bicycle, particularly a motor-assisted bicycle, comprising a bearing sleeve and a mounting shaft which extends in the bearing sleeve and a main frame member which extends rearwardly and downwardly from the steering head and consists preferably of two half-shells which are welded together.

2. Description of the Prior Art

The main frame member extends rearwardly and downwardly from the steering head and either joins the seat tube before the rear wheel or is continued by the seat pillar. This main frame member leaves behind the steering head a free space so that the rider can conveniently mount the vehicle. In the previous practice, the bearing sleeve has been secured to the forward end of the main frame member and has usually been welded to or into the main frame member whereas the mounting shaft which extends through the bearing sleeve belongs to the fork head of the front wheel fork and in most cases is connected to the blades of the front wheel fork by upper and lower bridges. For this reason, the main frame member must extend upwardly as far as to the top end of the bearing sleeve, i.e., to a relatively high level below the handlebar, so that the free space which is required for a convenient mounting of the vehicle by the rider is restricted. Another disadvantage resides in that Bowden and electric cables which lead to hand levers, switches and/or instruments mounted on the handlebar cannot extend through the steering shaft into the main frame member but must be exposed at least in part so that they are not protected.

Whereas a design is known in which the bearing sleeve of the steering head forms part of the fork head of the front wheel fork (British Pat. No. 209,921), the mounting shaft of the steering head of that arrangement is held above and below the bearing sleeve by a pair of frame tubes so that the frame must also extend upwardly to the top end of the bearing sleeve and cables cannot be extended in the mounting shaft. When it is desired to remove the front wheel fork, the upper pair of frame tubes must be disconnected from the mounting shaft of the steering head before the bearing sleeve can be pulled off upwardly. This is relatively complicated. Besides, a relatively expensive tubular frame is required.

SUMMARY OF THE INVENTION

It is an object of the invention to eliminate these disadvantages and to provide a bicycle, particularly a motor-assisted bicycle, which is of the kind described first hereinbefore and which provides a larger free space above the main part of the frame and wherein Bowden and electric cables can be concealed adjacent to the steering head.

This object is accomplished according to the invention in that the mounting shaft's lower end is secured to the forward end of the main frame member and projecting upwardly therefrom, and the bearing sleeve is rigid with the fork head of the front wheel fork.

Because the mounting shaft projects upwardly from the forward end of the main part of the frame and the bearing sleeve is rigid with the fork head and is mounted on the upright shaft, the main frame member need not extend below the handlebar to such a high elevation as was previously required and the level of its top edge is lower at least by the entire length of the bearing sleeve than in the conventional designs. This results in a larger free space above the main frame member so that the rider can mount the bicycle more easily. Because the mounting shaft is rigidly and non-rotatably secured to the forward end of the main frame member and may be tubular, Bowden and electric cables may extend from the hollow mounting shaft into the main frame member so that these Bowden and electric cables can be entirely concealed adjacent to the steering head and can easily be introduced into the hollow mounting shaft from the handlebar, i.e., from above. The design according to the invention affords also the advantage that the assembling work is simplified because the front wheel fork can be completely assembled before it is mounted on the frame. For the latter purpose it is sufficient to fit the bearing sleeve, which is combined with the fork head on the upwardly projecting mounting shaft, and to lock the bearing sleeve with a suitable nut.

BRIEF DESCRIPTION OF DRAWING

The drawing is a vertical sectional view showing by way of example those parts of a motor-assisted bicycle which are necessary for an understanding of the invention.

DESCRIPTION OF THE PREFERRED EMBODIMENT

A main frame member 1 consists of two half-shells of sheet metal, which are welded together, and is downwardly and rearwardly inclined from a fork head 2 to a seat pillar not shown. A tubular mounting shaft 3 of the steering head is welded in main frame member 1 at the forward end thereof and protrudes upwardly therefrom. A bearing sleeve 4 of the steering head is mounted on mounting shaft 3 by means of ball bearings and is held by a nut 5. The bearing sleeve 4 is rigid with the fork head 2 and for that purpose is rigidly connected in a suitable manner to the sockets 6 which receive the fork blades 7. The fork head 2 is provided with a half-cylindrical mount 8 for the handlebar 9, which is indicated in section and is clamped to the fork head by clips or the like. It is apparent that electric or Bowden cables 10 indicated in phantom can be extended from above through the hollow mounting shaft 3 into the main frame member 1 so that these cables are concealed adjacent to the fork head 2.

What is claimed is:

1. A steering head for a bicycle comprising a main frame member having a forward end and extending downwardly and rearwardly from the forward end, and a front wheel fork having a fork head, which comprises
   (a) a tubular mounting shaft open at both ends and having a lower end secured to the forward end of the main frame member,
      (1) the mounting shaft projecting upwardly from the forward end of the main frame member and defining a passageway for cables, and
      (2) the main frame member being hollow and the passageway being in communication with the interior of the hollow main frame member, and
   (b) a bearing sleeve rigid with the fork head and rotatably mounted on the mounting shaft.

* * * * *